Sept. 5, 1967  R. A. HORTON  3,339,622
METHOD OF REMOVING PATTERNS FROM INVESTMENT MOLDS
Filed May 26, 1965
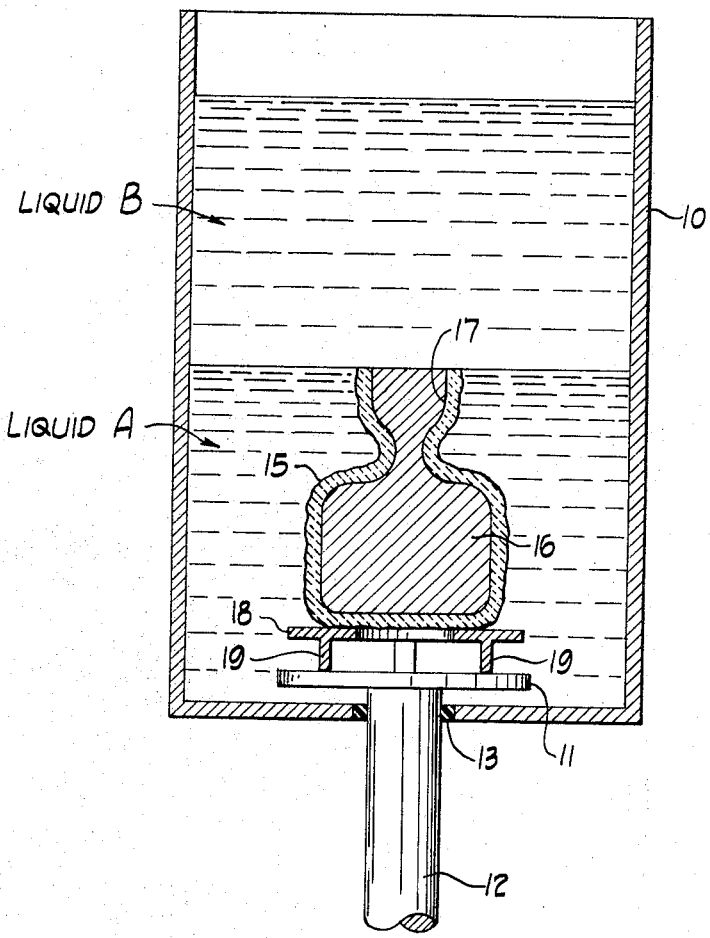
INVENTOR.
ROBERT A. HORTON
BY *Watts & Fisher*
ATTORNEYS.

United States Patent Office 3,339,622
Patented Sept. 5, 1967

3,339,622
METHOD OF REMOVING PATTERNS FROM INVESTMENT MOLDS
Robert A. Horton, Chesterland, Ohio, assignor to Precision Metalsmiths, Inc.
Filed May 26, 1965, Ser. No. 458,905
6 Claims. (Cl. 164—36)

This invention relates generally to the art of investment casting, and more specifically to improvements in ceramic shell molding techniques of precision casting wherein shell molds suitable for casting metal are prepared by building up layers of refractory material around disposable patterns which are then destroyed without disrupting the shell mold.

Ceramic shell molds are usually prepared by coating a disposable pattern with a refractory slurry consisting essentially of a refractory powder and a suitable binder solution capable of hardening by drying at room conditions. After dipping, the excess slurry is drained from the pattern and the slurry coating is sanded or stuccoed with coarser refractory particles. This process of dipping and stuccoing is repeated until a refractory shell having the desired thickness is built up around the pattern. The usual thickness range is from ⅛ of an inch to ½ of an inch, although thinner or heavier shells may be formed for special situations. After forming the refractory shell mold, the disposable pattern is removed from the mold and it is prepared for the casting operation.

The typical pattern materials used in ceramic shell molding processes have been either wax blends or synthetic resins such as polystyrene and, occasionally, polyethylene. More recently, disposable pattern materials have been developed consisting essentially of a polymerized rosin, a vinyl resin, and a suitable wax blend.

A critical stage in the preparation of ceramic shell molds is the elimination of the patterns. Depending upon the type of pattern material, different pattern removal operations have been developed in the past for destroying the patterns after formation of the refractory shell molds. However, regardless of the particular technique, care must be exercised to prevent cracking of the relatively thin walls of the molds.

This problem of removing disposable patterns from investment molds of the ceramic shell type without cracking the molds is well known and arises from the fact that the thermal expansion coefficients of the usual pattern materials are much higher than those of the refractory materials used in forming the shell which surrounds the patterns. When the shell containing the disposable pattern is heated to melt the pattern material, the internal expansion forces created by the heated patterns are capable of cracking the surrounding shell. In addition to this difference in thermal expansion coefficients, the conventionally used pattern waxes generally exhibit a large volume change in passing from the solid to the liquid state, and this volume change may cause further cracking if the wax patterns are melted faster in any area than the material can either flow out of the mold opening or soak through the walls of the shell.

When using patterns made of wax and the recently developed pattern material blends, the conventional methods of removing the patterns from ceramic shell molds usually involve rapid heating of the shell in order to promote surface melting of the pattern before the bulk of the material can heat up sufficiently to crack the shell due to its higher coefficient of thermal expansion compared to that of the shell material. The most widely practiced of these conventional methods is the so-called "flash de-waxing" technique. This technique involves plunging the shell containing the wax pattern directly into a furnace operating at an elevated temperature, for example, at a temperature in the range of from about 1600° F. to about 1800° F. Due to the condition of intense heat and the low thermal diffusivity of the wax, the heat transfer through the shell is usually rapid enough to melt a surface skin of the pattern, and the molten surface material either flows from the mold opening or soaks through the shell. The space provided in each mold cavity by the melting of the surface layer of pattern material may be sufficient to accommodate the bulk of the pattern material so that it will not expand and crack the shell upon further heating.

Other conventional methods based on the principle of rapidly heating the shell molds containing the patterns include the practice of surrounding the shell with hot particles of refractory material or metal. A somewhat similar technique involves immersing the shell suddenly in a bath of hot liquid or molten metal.

Ceramic shell molds de-waxed by the techniques described above are subject to cracking due to the thermal shock resulting from the high temperatures involved and the fact that the shells must be plunged directly into the heating medium. Additional cracking may occur during cooling of the molds. This problem is particularly serious when the shells have relatively large unbroken surfaces. In order to avoid cracking due to thermal shocks, it has been proposed to form relatively expensive molds containing 97% or more fused silica as the refractory in order to take advantage of its low coefficient of thermal expansion and resulting resistance to thermal shock.

Another serious source of cracking encountered during rapid heating of the shell molds, particularly by the flash de-waxing technique, results from the fluid pressures which sometimes occur when the extremities of the pattern melt very rapidly so that the molten wax cannot flow out of the mold or soak through the shell fast enough to relieve the pressure build-up. In such instances, the shell around the entire face of a pattern has been blown off by the pressure. In efforts to avoid such an occurrence, shell molds are conventionally formed with wax relief holes which must be patched prior to casting.

When patterns are formed of synthetic resin, it usually has not been possible successfully to eliminate such patterns from refractory shell molds by any heating technique. This is because the synthetic resins soften very gradually without significant melting at the mold interface. As a result, plastic patterns will expand and crack shell molds before becoming fluid enough either to be absorbed into the mold or to squeeze out of the mold opening. Furthermore, the conventionally used plastics, especially polystyrene, tend to decompose rapidly under intense heat and it is believed that the vapors which are evolved become trapped in the remaining viscous plastic to produce a foaming mass which further increases the cracking pressures within the mold.

The practice heretofore followed in eliminating plastic patterns from ceramic shell molds generally involves softening or dissolving the patterns with suitable solvents. This has been done successfully with urea-base patterns which are readily dissolved by water and with polystyrene patterns which are softened or dissolved with suitable organic solvents, such as trichloroethylene. In the latter case, special precautions may be required to prevent the shells from being cracked due to the swelling of the polystyrene under the action of the solvents.

In another conventional process for removing wax patterns, the principle of rapid heating and the principle of dissolving the patterns with a solvent are combined. According to this practice, the shell is subjected to the vapors of a boiling solvent, such as by being suspended in a trichloroethylene degreaser operating at an elevated temperature. The solvent vapors condensing on the shell provide rapid heating and some solvent action.

While all of the above-discussed prior pattern removal methods have been practiced with some success in the particular situations in which they are best suited, they are all subject to certain disadvantages which limit a wide range of application to all pattern materials and mold sizes and shapes. It is a purpose of the present invention to provide a novel method of pattern removal which is based on new principles and which overcomes many of the difficulties and shortcomings of the various prior art procedures. In particular, it is a purpose of the present invention to provide a new and improved pattern removal method which is adopted for use with any of the known pattern materials and types of shell molds.

The method of this invention generally involves the novel concept of incrementally heating portions of the shell mold containing the pattern to be removed. In accordance with this concept, the temperature of the shell is raised gradually in such a manner that the shell and pattern are progressively heated in small portions, while the remainder of the unmelted pattern and the shell surrounding it are kept below the temperature at which cracking due to thermal expansion could occur. This incremental heating of the shell and the pattern is preferably accomplished by initially placing the shell in a medium, such as a liquid, which is maintained near the temperature at which the mold is formed around the pattern and then slowly moving the shell into a second medium which is maintained at a temperature above the melting point of the pattern. The movement of the shell is controlled so that incremental portions of the pattern are melted by exposure to the second medium, while undue heating of the remainder of the pattern is prevented by exposure to the first medium.

The incremental heating of the shell mold and the pattern avoids the difficulties associated with the conventional pattern removal techniques which involve rapid heating. In particular, ceramic shell molds processed in accordance with this invention are not subject to cracking due to thermal shocks such as have resulted in the past due to the high temperatures which have been employed. At the same time, it is possible to form the molds of relatively inexpensive materials, thus avoiding the more expensive materials heretofore used in an effort to provide resistance to thermal shock. It is also possible successfully to remove the patterns from the shell molds without cracking even though the molds are of a complex configuration and/or have relatively large, unbroken surfaces.

Another important advantage of the invention is that it is possible to employ the new methods successfully in destroying patterns formed of synthetic resins, as well as wax patterns and patterns formed of wax and resin blends. Thus, the method of this invention is versatile and is adapted for use with all of the conventionally used pattern materials. A further advantage is that synthetic resin patterns can be destroyed faster than by the conventional method of dissolving the patterns and without the precautions heretofore required to prevent cracking of the molds due to the internal fluid pressures developed by the dissolved material.

Other advantages and a fuller understanding of the invention will be had by reference to the following detailed description and the accompanying drawing. The drawing diagrammatically illustrates an apparatus which may be used in carrying out the preferred process of this invention.

General description of method

Referring to the drawing, the illustrated apparatus is shown to comprise a container 10 which is of a size sufficient to hold a shell mold immersed in a quantity of liquid. A vertically movable platform 11 is located within the container 10 and is carried by a pedestal or rod 12. The pedestal or rod 12 projects through the bottom wall of the container and is surrounded by a suitable sealing ring 13 to prevent leakage of the liquid from the container. The platform 11 and the supporting rod 12 can be operated by any suitable means (not shown), such as by conventional press equipment actuated mechanically or by air or hydraulic pressure, to raise the mold within the container 10 in small steps.

In carrying out the process, a shell mold 15 containing the pattern 16 to be removed is placed on the platform 11 so that the mouth or opening 17 of the mold is uppermost. The mold 15 may be supported on a ring 18 which is spaced above the platform 11 by legs 19 in order to afford circulation of the liquid around the bottom portion of the mold.

Prior to being subjected to the pattern removal operation, the mold 15 is at a starting temperature which preferably is no higher than the room temperature at which the mold was formed around the pattern 16. Typically, the temperature of the room in which the molds are made is maintained around 80° F., although the temperature may vary in different foundries.

A first liquid A, which is at approximately the starting temperature of the shell mold 15 or even at a lower temperature, is placed in the container 10 around the mold. The level of the liquid A is initially about even with the mold opening 17. A second liquid B heated to a temperature above the melting point of the pattern 16 is then poured into the container 10 on top of the liquid A. The depth of the liquid B is preferably sufficient to surround the mold 15 when it is subsequently raised in the container by actuation of the platform 11.

The liquids A and B are selected as a pair so that they exhibit certain definite properties relative to each other and to the pattern material to be removed. The liquid B should be immiscible with the liquid A and preferably should have a density which is lower than that of liquid A, but higher than the density of the material of the pattern 16. In addition, the liquids must not attack the shell in a harmful manner, for example, by dissolving the refractory binder and softening the shell.

With the liquids A and B and the shell 15 disposed within the container 10, the shell is raised gradually by the platform 11. Preferably, the mold is elevated in a series of small steps. The movement of the shell into the liquid B is controlled so that the heat of the liquid progressively melts small portions of the pattern 16. Because of the preferred higher density of the liquid B, the melted pattern material is continually floated away from the mold to form a layer on the top of the liquid B, and this layer of melted pattern material can either be allowed to accumulate or it can be ladled off as desired. As the mold is moved into the liquid B incrementally to melt the pattern, undue heating of the remaining portions of the pattern is prevented by maintaining the bulk of the liquid A at a temperature below that which would cause the pattern to expand and crack the mold.

When all of the pattern material 16 has been melted and removed from the mold 15, the liquid B is withdrawn and the shell is removed and inverted to pour out whatever liquid it contains. It will be understood that the shell 15 can also be removed before the two liquids A and B are separated.

In carrying out the foregoing incremental pattern removal operation, a clear line of temperature demarcation will persist between the liquids A and B. This is because the two liquids are immiscible so that the hot liquid B will not mix with the cool liquid A and because the only major mechanism of heat transfer through the liquid A is the relatively slow one of conduction. Convection is prevented by the fact that the liquid A is heated from the top. As the top of the liquid A becomes warmer, its density drops and it is buoyed up by the cooler, denser liquid below. Hence, the liquid A serves to maintain the exposed portions of the shell mold near or below its starting temperature except for that portion which extends into the hot zone formed by the liquid B.

Preferably, the liquid B is not a solvent for the pattern material so that the melted material can float to the top where it can be readily removed or separated as described above. It should be noted, however, that the process can still be carried out even if the pattern material is soluble in the liquid B, but this makes the separation of the pattern material more difficult and may not be desirable from an economical standpoint. The liquid A may or may not be a solvent for the pattern material. If it is a solvent, it should not be so fast acting that it will penetrate through the porous walls of the shell and cause the pattern to swell and crack the mold during the time interval required for the melting operation.

There are many liquids suitable for use as one or both of the liquids A and B in order to provide the functions and properties necessary in carrying out the described process. By way of example, suitable liquids include glycerine, water, salt solution, trichloroethylene, tetrachloroethylene, tetrabromoethylene and the like. Liquids such as bis-(m-phenoxyphenyl) ether, which supercools to a pour point of about 5° F. and which can be heated above 800° F., also can be used. The important criterion in selecting the two liquids is that they be chosen as a pair to exhibit the required physical properties relative to each other and to the pattern material. Thus, a liquid which serves the function of the liquid A in one situation may also serve the function of liquid B in a different situation.

The speed with which the shell can be safely raised through the liquid without cracking depends upon the particular materials of the pattern and the shell, the liquid combination used and the temperatures involved. Usually, the process is carried out somewhat slower than the rapid heating techniques generally described above, although it eliminates many of the disadvantages, particularly cracking due to thermal shocks, that are associated with such conventional practices. However, the new process can be carried out faster than the conventional technique of dissolving synthetic resin patterns with a suitable solvent. The actual speed, that is the size of the steps in which the mold is raised and the length of time of each step, is adjusted so that the pattern is melted progressively without unduly heating the shell below the area where the pattern material has been already melted.

In some applications, it may be desirable to provide either heating coils for the liquid B (not shown), cooling coils for the liquid A (also not shown) or both in order to supply supplementary heating and/or cooling. The provision of heating and/or cooling coils may be especially desirable for large molds and when a plurality of molds are being processed in a single operation.

*Example I*

A relatively small test pattern was prepared consisting of a wax pattern of a typical commercial part mounted on a wax base. The pattern was approximately 4¼ inches high. A ceramic shell mold was produced around the pattern in accordance with normal shell-making practice by dipping it in a refractory slurry formed of three parts zircon powder and two parts fused silica powder suspended in a bonding liquid consisting essentially of a colloidal silica sol, a small amount of an organic film former, and minor amounts of a wetting and de-foaming agent. The first two dips were each sanded with granular zircon and each of the remaining four coatings were sanded with a coarse fire clay grog. Each dip coating was allowed to dry thoroughly before application of the next dip coating. Following the application of the sixth and final coating, the mold was allowed to dry overnight. The final wall thickness of the six dip mold was approximately 3/16 of an inch. The room temperature at which the mold was formed was approximately 80° F.

Trichloroethylene was used as the bottom, cool liquid A. The temperature of the trichloroethylene was 50° F. so that the solubility of the wax pattern in the trichloroethylene was negligible. The top, hot liquid was glycerine heated initially to a temperature in the range of from about 240° F. to about 260° F. Initially, there was a slight boiling of the trichloroethylene when the hot glycerine was introduced into the container 10, but this occurred only at the surface of the trichloroethylene and the balance remained relatively cool during the entire process. The shell, prepared in the manner described above, was initially at a temperature of 80° F. The shell was raised slowly through the trichloroethylene and into the hot glycerine so that the entire operation took approximately 30 minutes. At the conclusion of the operation, the shell mold was found to have been completely dewaxed without the occurrence of any cracking or other damage. The molten wax floated to the top of the glycerine bath during the procedure and formed an insoluble layer which was easily removed for re-use.

*Example II*

In this example of the invention, a production size shell mold was produced around a pattern assembly formed entirely of wax. The pattern assembly consisted of a wax pattern of a medium size commercial part having a size of 3¾ inches by 4½ inches by 1⅜ inches which was attached by four gates to a wax center tree. The center tree was 1¾ inches in diameter and 6 inches high and was mounted on a base which was 1⅝ inches in diameter by 3⅞ inches high. This pattern assembly was used to prepare another six dip ceramic shell mold in the same manner as in Example I.

The shell was initially at a temperature of 80° F. Tetrachloroethylene was selected as the liquid A and was introduced into the container around the shell at a starting temperature of 56° F. In this example of the invention the bottom portion of the container was water-cooled to help maintain the tetrachloroethylene at this temperature throughout the entire operation. The top liquid B was again glycerine at a temperature between 290° F. and 300° F. Heating tape was wrapped around the top of the container and heat was applied to maintain the temperature of the glycerine. The shell was raised gradually through the tetrachloroethylene and the glycerine so that the entire operation was completed in one hour. The shell was completely dewaxed at the end of one hour without occurrence of cracking or other damage to the shell.

*Example III*

Another six coat shell mold was formed as previously described around a polystyrene pattern attached to a wax base. The polystyrene pattern was a replica of a typical commercial part and weighed 7.9 grams. The shell was initially at a temperature of 80° F. and tetrachloroethylene at a starting temperature of 55° F. was poured in the container to serve as the liquid A. The top liquid B was glycerine at 470° F. As was the case in Example I, there was some boiling at the surface of the tetrachloroethylene when the glycerine was poured into the container, but the temperature of the bulk of the tetrachloroethylene remained below the starting temperature of the shell during the pattern removal operation. Both the polystyrene pattern and the wax base were melted out of the shell and floated to the top of the hot glycerine with no cracking or other damage to the shell. The pattern removal operation was accomplished in two hours. During this time, the shell was elevated slowly in the container so that it was progressively moved in small stages into the hot glycerine.

In the above examples of the invention, glycerine was used as the top liquid B because of its high boiling point and the characteristic of not being a solvent for most of the pattern waxes. However, as previously discussed, it is possible to use different combinations of liquids and to employ glycerine as the liquid A. One combination that has also been used successfully was dimethyl phthalate (boiling point 280° C., density 1.19) as the top liquid with glycerine (boiling point 290° C. density 1.258) as the bottom liquid.

It will be seen that each illustrative example of this invention comprises the novel concept of progressively heating the shell molds in stages by slowly elevating the shells from a cool zone preferably below the melting point of the pattern and the starting temperature of the shell into a hot zone above the melting point of the patterns to be removed. Various combinations of liquids can be employed to form the hot and cool zones. In selecting such liquids, the liquids are chosen so that they are immiscible in each other and so that the top liquid preferably has a density which is lower than that of the bottom liquid, but higher than that of the pattern material. The difference in densities of the immiscible liquids results in a clear line of temperature demarcation between the liquids and permits the temperatures of the liquids A and B to be maintained respectively below and above the melting point of the pattern. The higher density of liquid B compared to that of the pattern material allows the incrementally melted material to be floated away from the mold and removed from the surface of the liquid.

By progressively heating the shell in small stages in the manner described to melt the pattern incrementally, cracking of the shell molds due to thermal shocks is avoided. In general, the process is somewhat slower than the prior art practices involving rapid heating of the shells, but it is faster than the prior art practices of dissolving synthetic resin patterns with a suitable solvent. Another advantage of this invention is that the process is suitable for use with substantially all pattern materials.

As used herein, the term "pattern" is intended to encompass a single pattern member which is a replica of the part to be cast and the gating system associated with the pattern, as well as a set-up comprising a plurality of such patterns attached to a center tree in the manner well understood in the art.

Many modifications and variations of the invention will be apparent to those skilled in the art in view of the foregoing detailed disclosure. Therefore, it is to be understood that, within the scope of the appended claims, the invention can be practiced otherwise than as specifically described.

What is claimed is:

1. In a process of producing a refractory shell mold by coating a pattern with a refractory slurry, stuccoing the coated pattern with refractory particles, drying the coating and repeating the steps of coating, stuccoing and drying until a thin ceraminc shell suitable for casting has been formed, a method of destroying the pattern without cracking the shell, said method comprising the steps of immersing the shell in a first liquid at a temperture near the temperature at which the shell was formed around the pattern, and incrementally melting the patter by moving the shell into a second liquid at a temperature at least equal to the melting point of the pattern.

2. In a process of producing a refractory shell mold by coating a pattern with a refractory slurry, stuccoing the coated pattern with refractory particles, drying the coating and repeating the steps of coating, stuccoing and drying until a thin ceramic shell suitable for casting has been formed, a method of destroying the pattern without cracking the shell, said method comprising immersing the shell containing the pattern in a first liquid at a temperature no higher than the temperature at which the shell was formed around the pattern, placing on top of the first liquid a second liquid heated above the melting point of the pattern, moving the shell from the first liquid into the second liquid, controlling the movement of the shell so that the pattern is incrementally melted by exposure to the second liquid, and maintaining the temperatures of the first and second liquids until the pattern has been destroyed.

3. The method of claim 2 wherein the first and second liquids are immiscible in each other.

4. The method of claim 3 wherein the second liquid has a density lower than the first liquid and higher than that of the pattern material.

5. In a process of producing a refractory shell mold by coating a pattern with a refractory slurry, stuccoing the coated pattern with refractory particles, drying the coating and repeating the steps of coating, stuccoing and drying until a thin ceramic shell suitable for casting has been formed, a method of destroying the pattern without cracking the shell, said method comprising the steps of placing the shell containing the pattern to be destroyed into a container, immersing the shell in a first liquid at a temperature no higher than the temperature at which the shell was formed around the pattern, placing a second liquid into the container on top of the first liquid, said second liquid being characterized by being immiscible in the first liquid and having a density which is lower than that of the first liquid but higher than the density of the pattern material, establishing a temperature of the second liquid which is above the melting point of the pattern, moving the shell to expose a portion thereof to the second liquid and thereby melt part of the pattern, maintaining the rest of the shell in the first liquid, allowing the melted pattern material to float to the top of the second liquid, and continuing the movement of the shell so that the pattern is progressively melted and removed from within the shell.

6. In a process of investment casting wherein a refractory mold is formed around a pattern, a method of destroying the pattern without cracking the mold comprising the steps of placing the mold in a first medium which is a liquid at a temperature below that which would cause the pattern to expand and crack the mold, providing a second medium which is at a temperature high enough to melt the pattern, and incrementally melting the pattern by moving the mold from the first medium into the second medium.

References Cited

UNITED STATES PATENTS

| | | | |
|---|---|---|---|
| 2,759,232 | 8/1956 | Demeter et al. | 22—196 |
| 3,010,852 | 11/1961 | Prange et al. | 22—196 X |

J. SPENCER OVERHOLSER, *Primary Examiner.*

E. MAR, *Assistant Examiner.*